United States Patent
Chuang et al.

(10) Patent No.: US 8,377,546 B2
(45) Date of Patent: Feb. 19, 2013

(54) PLASTICS ELECTRODE MATERIAL AND SECONDARY CELL USING THE MATERIAL

(75) Inventors: Chen-Chun Chuang, Fongyuan (TW); Ching-Yun Hsu, Fongyuan (TW); Li-Hsiang Perng, Fongyuan (TW)

(73) Assignee: Silver H-Plus Technology Co., Ltd., Taichung Hsien (TW)

( * ) Notice: Subject to any disclaimer, the term of this patent is extended or adjusted under 35 U.S.C. 154(b) by 609 days.

(21) Appl. No.: 12/231,964

(22) Filed: Sep. 8, 2008

(65) Prior Publication Data
US 2010/0062333 A1    Mar. 11, 2010

(51) Int. Cl.
H01M 2/16 (2006.01)
H01M 6/04 (2006.01)
H01M 4/60 (2006.01)
H01M 4/62 (2006.01)
H01M 4/64 (2006.01)

(52) U.S. Cl. ........ 428/213; 429/203; 429/204; 429/232; 429/233; 429/251; 429/137

(58) Field of Classification Search ................ 429/204, 429/188, 213, 347, 232, 231.1, 203, 137, 429/233, 251; 29/623.5
See application file for complete search history.

(56) References Cited

U.S. PATENT DOCUMENTS

| | | | | |
|---|---|---|---|---|
| 2002/0073534 A1* | 6/2002 | Kurosaki et al. | ............. | 29/623.5 |
| 2003/0044680 A1* | 3/2003 | Umemoto | ............. | 429/213 |
| 2003/0091905 A1* | 5/2003 | Nobuta et al. | ............. | 429/347 |
| 2004/0209165 A1* | 10/2004 | Kurosaki et al. | ............. | 429/213 |
| 2005/0106466 A1* | 5/2005 | Dasgupta et al. | ............. | 429/232 |
| 2006/0068284 A1* | 3/2006 | Takahashi et al. | ............. | 429/213 |
| 2006/0286456 A1* | 12/2006 | Fu et al. | ............. | 429/231.1 |
| 2007/0172731 A1* | 7/2007 | Nobuta et al. | ............. | 429/213 |

OTHER PUBLICATIONS

"Battery Separators", Chem Rev. 2004, 104, 4419 and 4426, Arora et al.*

"VGCF Products", Showa Denko Inc., retrieved online on Aug. 14, 2010 from: http://www.products-e.sdk.co.jp/SDK/products-e/products-e.nsf/fc44548239ff752849257185001e45bf/32104c19a2eb12a04925777500223564!OpenDocument.*

* cited by examiner

Primary Examiner — Basia Ridley
Assistant Examiner — Kenneth Douyette
(74) Attorney, Agent, or Firm — William E. Pelton, Esq.; Cooper & Dunham LLP

(57) ABSTRACT

A plastics electrode material includes a mixture having a nitrogen-containing conductive polymer and a conductive carbon material mixed with the polymer. The polymer is polyquinoline, polyphenylquinoxaline, polycarbazole, polypyridine, polypyrrole, polyaniline or polyindole. The conductive carbon material is 1% to 40% by weight of the mixture. The mixture is activated by a 0.2 M to 5 M proton-containing acidic electrolytic solution. The present invention further comprises second cells using the plastics electrode material. Because the conductive carbon material and high concentration acidic electrolytic solution are added to the polymer, the plastics electrode material has a high conductivity. Thus, the secondary cells have a high efficiency of charging and discharging and a long cyclic life.

57 Claims, 3 Drawing Sheets ic acid;

PLASTICS ELECTRODE MATERIAL AND SECONDARY CELL USING THE MATERIAL

BACKGROUND OF THE INVENTION

1. Field of Invention

The present invention relates to an electrode material, and more particularly to a plastics electrode material containing conductive polymers and having properties of fast charging and discharging and high capacity.

2. Description of the Related Art

Proton (hydrogen ion) secondary cell containing conductive polymers is a new type product after lithium secondary cell. Because proton has a smaller ion radius and faster ion speed, proton secondary cell has advantages of high working voltage, stable discharge curve, small self-discharge, long cyclic life and no pollution. Additionally, proton secondary cell can be totally made of polymers and provides a function of high current (10 amp for one cell) charging and discharging. Proton secondary cell can be applied to portable batteries (2 Ah), thin film batteries (200 μAh), small-sized batteries (200 mAh) and large-sized batteries (50 Ah).

Performance of proton secondary cell containing conductive polymers is highly related to properties of anode, cathode and electrolyte, especially anode. Furthermore, if anode material has higher potential than cathode material and good electron conduction property and change of the anode material composition does not greatly affect the cell voltage, the cell will have high working potential, plain curve of voltage, small IR resistance and low voltage drop. If anode material has reversibility on ion extraction/insertion, high diffusibility and storability and does not affect the cell volume with charging and discharging reaction, the cell will have high capacity, cycling life and stability. If anode material has high stability for the electrolyte and high thermal stability during charging, the cell will have cycling life and stability.

In other words, if a battery having good properties of high and stable working voltage, small IR resistance, low voltage drop, high capacity, cycling life and stability is prepared, the battery must use suitable anode material. Applying conductive polymers such as polyindole as anode and cathode materials under acidic conditions to proton secondary cell may have the advantages as follows: (1) the cell can be formed integrally on metallic foil, porous metallic substrate or conductive carbon substrate; (2) the cell has no memory effect and have a large number of charging and discharging cycles more than 100,000 times; (3) the cell can be manufactured with conventional processes; and (4) proton is a carrier for charging and discharging the cell.

Polyindole can be synthesized by electrochemical method or using oxidizing agents. The oxidizing agents comprise ferrous chloride and sodium thiosulfate. Because polyindole only contains hydrogen, nitrogen and carbon, polyindole is environmentally friendly. With advancing technology of manufacturing polyindole, polyindole is available commercially. Preformed polymer of cyclic polyindole tri-monomer is synthesized in prior art and has a capacity of 50 to 60 mAh/g with a charging and discharging mechanism of cation adsorption/desorption and a cyclic life of more 100,000 cycles at 90% charging and discharging. Thus, U.S. Pat. No. 6,300,015B1 Patent disclosed a cell having a separator between anode and cathode conductive polymers. However, the cell still has problems of low capacity and operating voltage compared to a lithium cell and is not suitable for practical applications.

Therefore, a main objective of the secondary cell industry is to increase anion absorption ability of anode material containing polyindole and conductivity of the cell so as to improve proton discharge efficiency of the cell.

To overcome the shortcomings, the present invention provides a plastics electrode material to mitigate or obviate the aforementioned problems.

SUMMARY OF THE INVENTION

The primary objective of the present invention is to provide a plastics electrode material and secondary cells using the material having properties of fast charging and discharging and high storage capacity.

A plastics electrode material in accordance with the present invention comprises a mixture having a nitrogen-containing conductive polymer and a conductive carbon material mixed with the polymer. The polymer is polyquinoline, polyphenylquinoxaline, polycarbazole, polypyridine, polypyrrole, polyaniline or polyindole. The conductive carbon material is 1% to 40% by weight of the mixture. The mixture is activated by a 0.2 M to 5 M proton containing acidic electrolytic solution.

The secondary cell in accordance with the present invention comprises an anode material, a cathode material, a separator, an electrolytic solution, an anode collecting member and a cathode collecting member.

The anode material comprises a mixture having a nitrogen-containing conductive polymer and a conductive carbon material. The nitrogen-containing conductive polymer is polyquinoline, polyphenylquinoxaline, polycarbazole, polypyridine, polypyrrole, polyaniline or polyindole. The conductive carbon material is mixed with the polymer and is 1% to 40% by weight of the mixture. The mixture is activated by a 0.2 M to 5 M proton-containing acidic electrolytic solution.

The cathode material comprises a mixture having a conductive polymer and a conductive carbon material. The conductive polymer is polyphenyl vinylene, polyfuran, polysulfide, polythiophene, polyquinoline, polyphenylquinoxaline, polycarbazole, polypyridine, polypyrrole, polyaniline or polyindole. The conductive carbon material is mixed with the polymer and is 1% to 40% by weight of the mixture. The mixture is activated by a 0.2 M to 5 M proton-containing acidic electrolytic solution.

The separator separates the anode and cathode materials.

The electrolytic solution is disposed between the anode and cathode materials.

The anode collecting member is connected to the anode material.

The cathode collecting member is connected to the cathode material.

Because the conductive carbon material and high concentration acidic electrolytic solution are added to the polymer (plastics material), the plastics electrode material has a high conductivity. Thus, the secondary cells have a high efficiency of charging and discharging and a long cyclic life.

Other objectives, advantages and novel features of the invention will become more apparent from the following detailed description when taken in conjunction with the accompanying drawings.

DETAILED DESCRIPTION OF THE INVENTION

Figure 1:
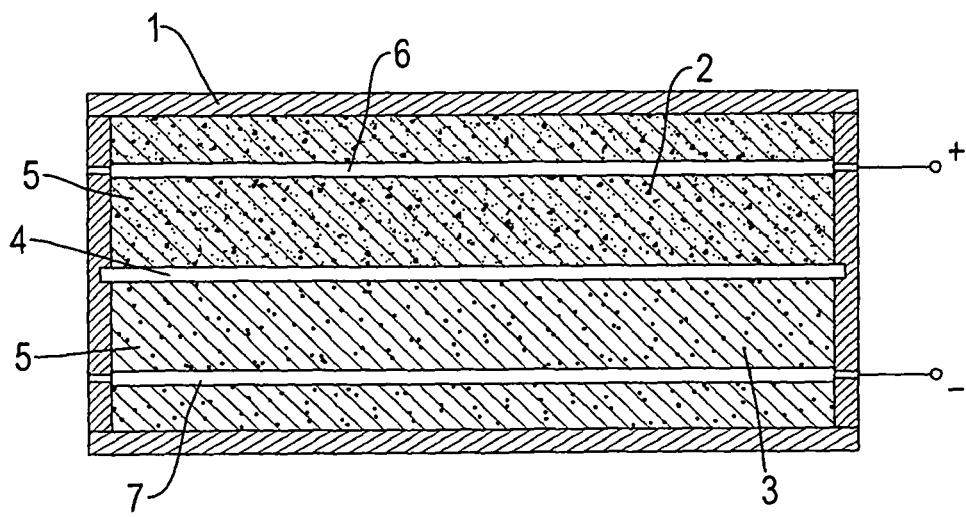
FIG. 1 is a schematic diagram of a secondary cell in accordance with the present invention.

With reference to FIG. 1, a secondary cell in accordance with the present invention comprises an outer sealing material (1), an anode material (2), a cathode material (3), a separator (4), an electrolytic solution (5), an anode collecting member (6) and a cathode collecting member (7).

The outer sealing material (1) is used for accommodating and sealing the foregoing materials and components and may be metal or plastic materials or metal/plastic composite material.

The anode material (2) comprises a mixture having a nitrogen-containing conductive polymer and a conductive carbon material mixed with the polymer so as to improve the conductivity of the anode material. The conductive carbon material is 1% to 40% by weight of the mixture. The mixture is activated by a 0.2 M to 5 M proton-containing acidic electrolytic solution. Thus, the anode material (2) has a high ion migration ability.

Preferably, the nitrogen-containing conductive polymer may be polyquinoline, polyphenylquinoxaline, polycarbazole, polypyridine, polypyrrole, polyaniline or polyindole. Among which, polyindole is preferable, may contain electron-withdrawing groups and may be nitro-containing polyindole, cyano-containing polyindole, halogen-containing polyindole, borate-containing polyindole, phosphate-containing polyindole, sulfonate-containing polyindole, cyanate-containing polyindole, isocyanato-containing polyindole. Among which, nitro-containing polyindole is preferable. The anode material (2) may be prepared mainly by chemical synthesis processes.

Preferably, the conductive carbon material may have a micro-scale or even nano-scale size and may be carbon black, graphite whisker, amorphous carbon, active carbon, mesoporous carbon, porous carbon fiber, nano carbon fiber, carbon nanotube or carbon fiber. The particle size of the conductive carbon material may be less than 10 μm.

Preferably, the acidic electrolytic solution may comprise sulfuric acid or organic acidic electrolytic solution.

The cathode material (3) comprises a mixture having a conductive polymer and a conductive carbon material mixed with the polymer so as to improve the conductivity of the cathode material (3). The conductive carbon material is 1% to 40% by weight of the mixture. The mixture is activated by a 0.2 M to 5 M proton-containing acidic electrolytic solution. Thus, the cathode material (3) has a high ion migration ability.

Preferably, the conductive polymer may be polyphenyl vinylene, polyfuran, polysulfide, polythiophene, polyquinoline, polyphenylquinoxaline, polycarbazole, polypyridine, polypyrrole, polyaniline or polyindole. Among which, nitrogen-containing conductive polymer is preferable and polyaniline is more preferable.

Preferably, the conductive carbon material may have a micro-scale or even nano-scale size and may be carbon black, graphite whisker, amorphous carbon, active carbon, mesoporous carbon, porous carbon fiber, nano carbon fiber, carbon nanotube or carbon fiber. The particle size of the conductive carbon material may be less than 10 μm.

Preferably, the acidic electrolytic solution may comprise sulfuric acid or organic acidic electrolytic solution.

The separator (4) is disposed between the anode and cathode materials (2, 3) to separate them. The separator (4) may be a porous membrane of polypropylene, composite membrane of polyethylene and polypropylene or fluorine-containing resin and may have a pore size less than 50 μm.

The electrolytic solution (5) is disposed between the anode and cathode materials (2, 3) and may comprise sulfuric acid or organic acidic electrolytic solution and may be the same with the acidic electrolytic solution activating the anode or cathode materials. Preferably, the organic electrolyte may comprise propyl carbonate, ethyl carbonate, mono-ammonium phosphate, lithium perchlorate, di-methyl formamide (DMF) and tetraethylammonium tetrafluoroborate (TEATFB) and may further comprise nano inorganic particles such as nano titanium dioxide, nano silicon dioxide or nano fullerene particles. When the nano inorganic particles are added to the electrolytic solution (5), the conductivity of the electrolytic solution (5) can be raised 10 times more than that of the electrolytic solution (5) without nano inorganic particles.

The anode collecting member (6) is connected to the anode material (2) and may be a metallic mesh/foil or conductive carbon material. The metallic mesh/foil may be a gold coated copper mesh/foil, gold coated aluminum mesh/foil, copper mesh/foil or aluminum mesh/foil. The conductive carbon material may be a carbon fiber fabric/non-woven fabric, nano carbon fiber fabric/non-woven fabric or graphite whisker fabric/non-woven fabric.

The cathode collecting (7) member is connected to the cathode material (3) and may be a metallic mesh/foil or conductive carbon material. The metallic mesh may be a gold coated copper mesh/foil, gold coated aluminum mesh/foil, copper mesh/foil or aluminum mesh/foil. The conductive carbon material may be a carbon fiber fabric/non-woven fabric, nano carbon fiber fabric/non-woven fabric or graphite whisker fabric/non-woven fabric.

Because the conductive polymers have conjugated bonds that allow $\pi$ electron to move along their chains, the conductive polymers have an intrinsic conductivity. However, the intrinsic conductivity of the conductive polymers is not sufficient for the application on the anode and cathode materials in accordance with the present invention. Thus, proton is introduced and doped into the conductive polymers as active substance and the concentration of the dopant such as sulfuric acid is controlled to adjust the conductivity of the conductive polymers. Thus, the conductivity of the conductive polymers can be raised to about $10^1$ S/cm ($10^{-6}$ to $10^{-4}$ S/cm if no active substance).

The doping of the anode and cathode materials is achieved by contacting the dopant (gaseous or liquid phase) with the anode and cathode materials or electrochemical oxidation or reduction. The doped anode and cathode materials will have a midgap with lower energy between bandgaps. The midgap is believed to be helpful for electron migration. The dopant is used to remove or add electrons from the conductive polymers. Taking polyindole as an example, when polyindole is doped with sulfuric acid, sulfuric acid will attract an electron from an indole ring and polyindole will lose an electron so as to form an indole ring having a radical cation (polaron) structure. The positive charge on the radical cation moves slowly. On the other hand, hydrogen absorbed on polyindole can move fast. Thus, high concentration sulfuric acid dopant can increase a number of indole rings having radical cation structure. When the anode and cathode materials are doped with more sulfuric acid or organic acidic electrolytic solution, the anode and cathode materials will be more conductive. However, there still is a suitable doping extent.

The compartments of the secondary cells in accordance with the present invention have a pH value lower than 3. The anode and cathode materials activated by the acidic electrolytic solution have a high conductivity and storage capacity for electrons in the materials.

The secondary cells in accordance with the present invention have the properties as follows: (1) high operating voltage; (2) high energy density; (3) stable operating voltage; (4) wide operating temperature range; (5) good cyclic characteristic; (6) long storage time; and (7) no poisonous and pollutant heavy metals. The anode material is key point of the secondary cells. The addition of the conductive carbon material and the activation with the acidic electrolytic solution are core technology of the present invention.

The major material of the anode material in accordance with the present invention is the nitrogen-containing conductive polymer. Among which, polyindole containing electron-withdrawing groups such as nitro, sulfonate or cyanate is core material. Polyindole can be manufactured with simple oxidation polymerization. Polyindole has the structure formula as follows:

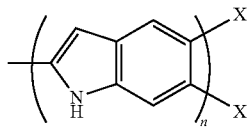

X = NO₂ or SO₃H

Electron-withdrawing groups are introduced into the "X" positions of polyindole to increase the thermal stability and the ability of pushing and withdrawing electron of polyindole and thus improve the capacity of charging and discharging.

Taking a secondary cell doped with 40% (5.3 mole) sulfuric acid in accordance with the present invention as an example, polyindole in sulfuric acid exhibits a cyclic voltammograms having two characteristics as follows: (1) two unstable irreversible peaks are shown at 0 to 0.9 V but the peaks disappear after several cycles; and (2) a stable reversible peak is shown at 1.05 V Nitro-containing polyindole in sulfuric acid exhibits a cyclic voltammograms having the characteristics as follows: (1) a reversible peak is shown at 1.15 V; and (2) no irreversible peak is shown at 0 to 0.9 V. The reversible peak of nitro-containing polyindole appears at a voltage 0.1 V higher than that of polyindole due to the higher electron-withdrawing ability of nitrogen in polyindole raised by nitro group. A charging and discharging cycle of nitro-containing polyindole is achieved by two steps as follows: (1) a reversible reaction performs at 0 to 0.9 V in the cyclic voltammograms; (2) polyindole performs oxidation and reduction reactions accompanying a reversible process of proton absorption and desorption at 0.9 to 1.2 V in the cyclic voltammograms.

Because the oxidation and reduction reactions accompany the reversible process of hydrogen absorption and desorption and hydrogen has a smallest size, the reacting system is very stable and the anode material has a very long usage life. When nitro-containing polyindole is applied to the anode material of the secondary cell, mixed with the conductive carbon material and activated by the proton-containing acidic electrolytic solution (organic or inorganic), a conducting mechanism is described as follows:

(1) the reversible reaction at 0 to 0.9 V (relative to Ag/AgCl electrodes) in the cyclic voltammograms is the charging and discharging processes of doped cation of nitro-containing polyindole and is shown as follows:

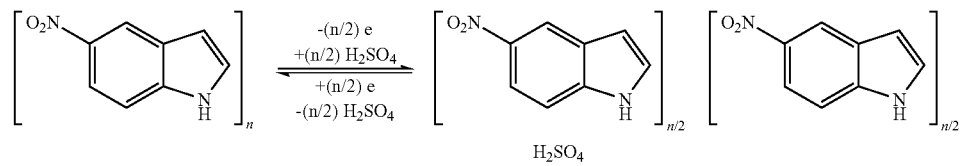

(2) the reversible reaction at 0.9 to 1.2 V (relative to Ag/AgCl electrodes) in the cyclic voltammograms is the charging and discharging processes of proton absorption and desorption and is shown as follows:

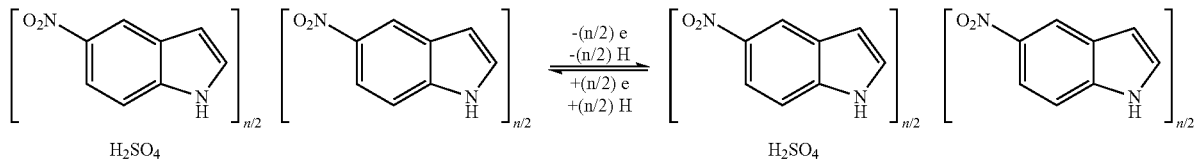

The foregoing mechanism shows that the charging and discharging processes is mainly related to proton absorption and desorption at 0.9 to 1.2 V. Thus, proton secondary cell has a good property of fast charging and discharging and has a cyclic number more than 10,000 times (under a condition of 60% charge and discharge capacity).

When polyaniline is doped with 40% (5.3 mole) sulfuric acid and performs oxidation and reduction reactions, a reversible reaction of proton absorption and desorption is also accompanied at −0.2 to 0.4 V. Doped polyaniline is stable and suitable for the cathode material. The reversible reaction of proton absorption and desorption is described as follows:

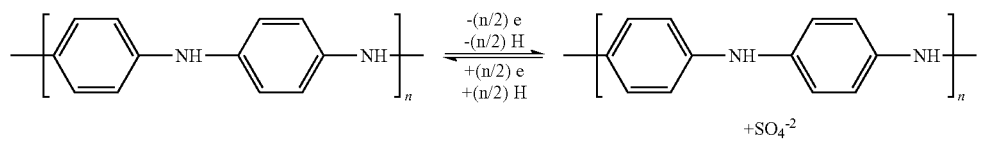

Figure 2:
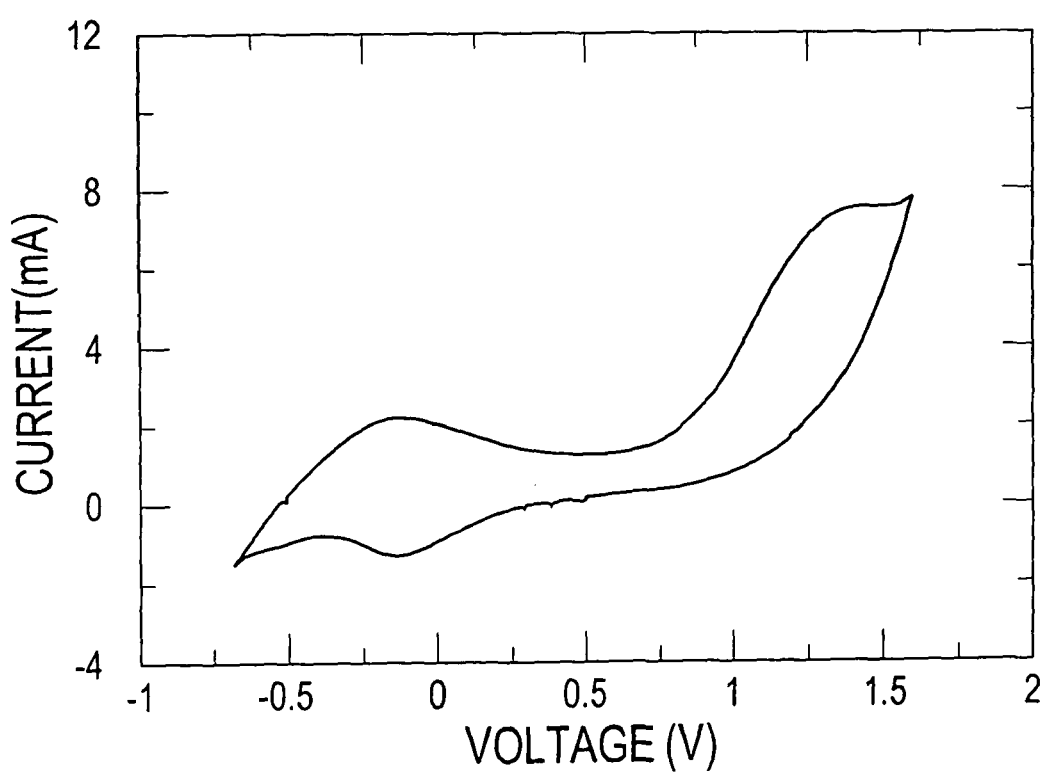
FIG. 2 is a cyclic voltammograms of a secondary cell in accordance with the present invention containing sulfuric acid.

With reference to FIG. 2, the secondary cell using the foregoing doped materials can perform oxidation and reduction reactions reversely and has a cyclic voltammograms as shown in FIG. 2. Compared to a lithium cell, the secondary cell is safe and reliable and has good properties of fast charging and discharging and long cyclic life.

The secondary cell in accordance with the present invention can be designed in an anode material limited manner. The cathode material is in excess of 10 to 15% of the anode material. Nitro-containing polyindole is preferably 75 to 80% of the anode material and the secondary cell can provide the capacity of 100 mAh/g. When the anode and cathode materials are doped with sulfuric acid, the concentration of sulfuric acid must be controlled so as to meet the requirement of proton diffusion and prevent the activity and stability of the conductive polymers from being damaged.

The following examples further illustrate the present invention but are not to be construed as limiting the invention as defined in the claims appended hereto.

EXAMPLE 1

Synthesis of Nitro-containing Polyindole

Process (1): Synthesis of polyindole

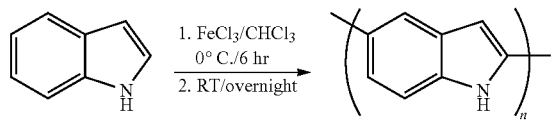

Scheme 1

Synthesis steps: (starting material: 200 g of indole is solved in a solvent to acquire a 1.5 to 2 L solution at 1 M concentration)

1. The reaction temperature was reduced to −5 to 15° C. (under ice bath) and 1.5 eq of ferric chloride was disposed in a flask. 0.1 to 2 L of chloroform was added to the flask to acquire a ferric chloride/chloroform solution and the solution was stirred for 5 to 25 minutes.
2. The starting material was added to the ferric chloride/chloroform solution slowly for about 1 hour. During the addition, chloroform was also added to prevent indole from adhering on the inner wall of the flask. (Because the reaction between indole and ferric chloride is violent, the reaction temperature must be controlled at the starting of the addition.)
3. The flask was filled with nitrogen gas during the reaction and ice was added to the bottle every 1 to 3 hours. The reaction period was 2 to 10 hours (at a temperature of about −5 to 15° C.) and the temperature was increased naturally to room temperature.
4. The solution in the flask was filtered to acquire a filter cake and the filter cake was washed with 1 to 3 L of water. Because the filter cake will release heat when washing, the filter cake was ice-bathed at the starting of the washing to prevent the filter cake from splashing. After the reaction between the filter cake and water was moderated, the filter cake was filtered and washed several times to acquire a product.
5. The product was dried in a vacuum oven (under a temperature of 60 to 100° C.).

Process (2): Nitration of polyindole

Synthesis steps: (starting material: 200 g of polyindole was solved in a solvent to acquire a 1.5 to 2 L solution)

1. The reaction temperature was reduced to −5 to 15° C. (under ice bath) and 1 to 6 eq of acetic anhydride (522 g) was disposed in a flask. 1.5 eq of nitric acid was added slowly (1 droplet per 1 to 10 seconds) to the flask to acquire a solution and the solution was stirred for 15 to 20 minutes.
2. The starting material was added to the solution slowly for about 0.5 to 5 hours. (Because the reaction between polyindole and the solution is violent, the reaction temperature must be controlled at the starting of the addition.)
3. Ice was added to the bottle every 10 to 30 minutes for controlling the reaction temperature to −5 to 15° C. until the addition of the starting material was finished. After the addition was finished, the solution in the bottle was stirred for about 15 to 20 minutes.
4. The solution in the bottle was filtered to acquire a filter cake and the filter cake was washed with 1 L of water. Because the filter cake will release heat when washing, the filter cake was ice-bathed at the starting of the washing to prevent the filter cake from splashing. After the reaction between the filter cake and water was moderated, the filter cake was filtered and washed several times to acquire a product.
5. The product was dried at room temperature for two days and then dried in a vacuum oven (under a temperature of 60 to 100° C.) for 1 to 5 days.

EXAMPLE 2

Synthesis of poly(5-nitroindole)

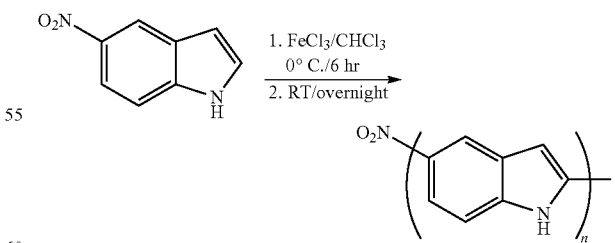

Scheme 2

Synthesis steps: (starting material: 250 g of 5-nitroindole was solved in a solvent to acquire a 1.5 to 2 L solution of 1 M concentration)

1. The reaction temperature was reduced to −5 to 15° C. (under ice bath) and 1 to 6 eq of ferric chloride was disposed in a flask. 0.5 L of chloroform was added to the flask to acquire a ferric chloride/chloroform solution and the solution was stirred for 10 to 15 minutes.

2. The starting material was added to the ferric chloride/chloroform solution slowly for about 0.5 to 5 hours. During the addition, chloroform was also added to prevent 5-nitroindole from adhering on the inner wall of the flask. (Because the reaction between indole and ferric chloride is violent, the reaction temperature must be controlled at the starting of the addition.)

3. The flask was filled with nitrogen gas during the reaction and ice was added to the bottle every 2 hours. The reaction period was 6 hours (at a temperature of about −5 to 15° C.) and the temperature was increased naturally to room temperature.

4. The solution in the flask was filtered to acquire a filter cake and the filter cake was washed with 1 to 4 L of water. Because the filter cake will release heat when washing, the filter cake was ice-bathed at the starting of the washing to prevent the filter cake from splashing. After the reaction between the filter cake and water was moderated, the filter cake was filtered and washed several times to acquire a product.

5. The product was dried in a vacuum oven (under a temperature of 60 to 100° C.).

EXAMPLE 3

Synthesis of Polyaniline

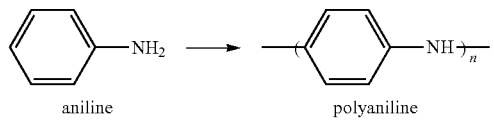

Synthesis steps:

1. Ammonium persulfate (11.5 g) was added to hydrochloric acid (1 M, 200 ml) to acquire an ammonium persulfate solution (under a temperature of about 1° C. with ice bath).

2. Aniline (20 ml) was added to hydrochloric acid (1 M, 300 ml) to acquire an aniline solution (under a temperature of about 1° C. with ice bath)

3. A flask was prepared and the aniline solution was disposed in the bottle. The ammonium persulfate solution was added to the aniline solution slowly for about 1 minute. The solution in the bottle was then stirred for 1.5 hour.

4. The solution in the flask was filtered to acquire a blackish green precipitate and the precipitate was washed with hydrochloric acid (1 M) until the filter liquor was colorless.

5. The precipitate was washed with ammonia water (0.1 M, 500 ml) to acquire polyaniline product.

EXAMPLE 4

Composition and Manufacturing of a Proton Secondary Cell Comprising Polyindole and Polyaniline (Using Sulfuric Acid to Activate Anode and Cathode Materials)

Figure 3:
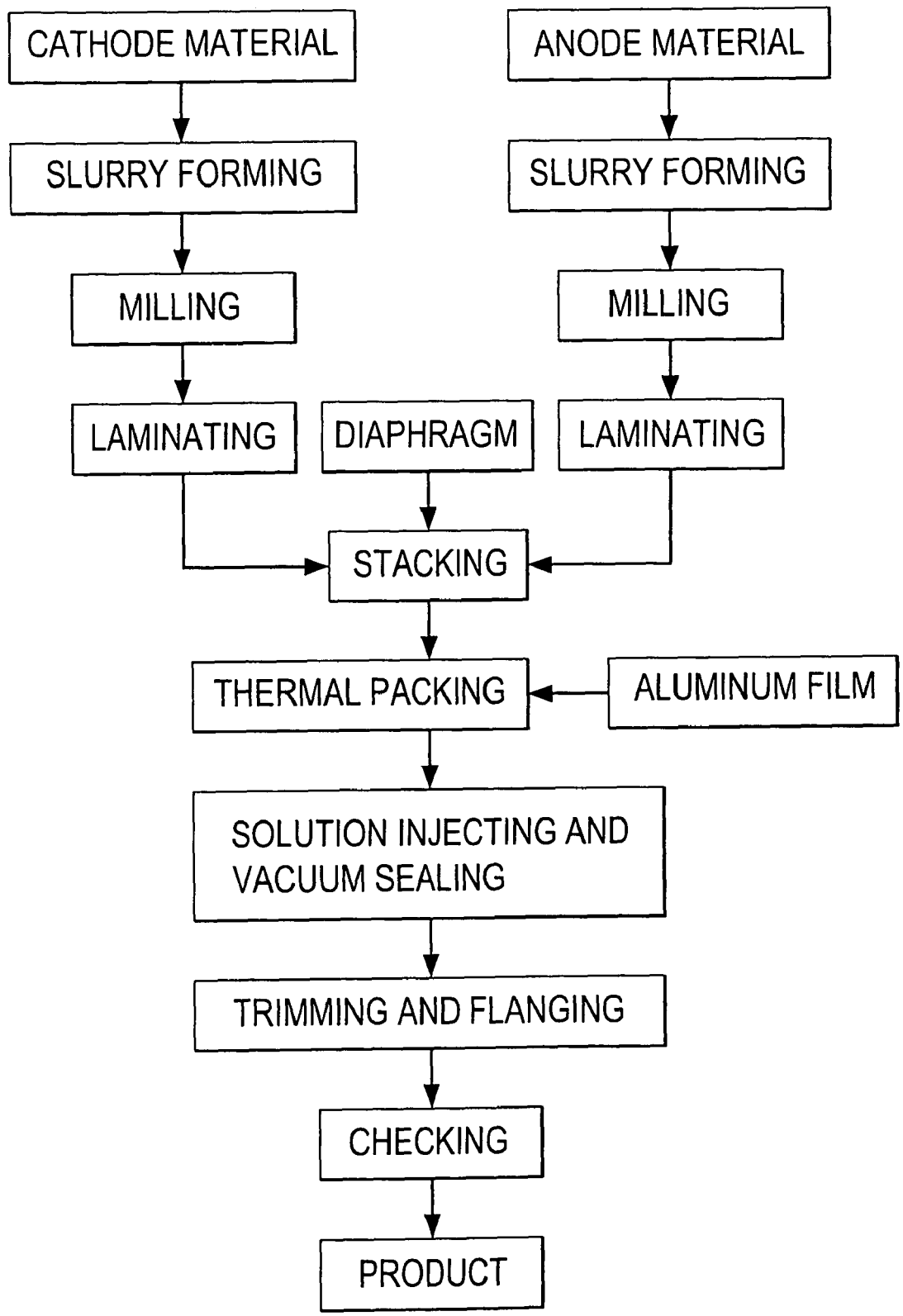
FIG. 3 is a block flow diagram of a secondary cell in accordance with the present invention.

With reference to FIG. 3, a mixture having 1% to 40% by weight of poly (5-nitroindole) or other nitro-containing polyindole and conductive carbon material mixed well with the polyindole was prepared. A solvent was added to the mixture and the mixture was stirred and dried under vacuum condition. The dried mixture was milled to form a powder and filtered. Then 0.2 to 5 M of sulfuric acid was added to the mixture to form a paste and the paste was coated on a collecting mesh. The excess sulfuric acid was removed to acquire an anode material.

A mixture having 1% to 40% by weight of polyaniline and conductive carbon material mixed well with the polyaniline was prepared. The conductive carbon material was carbon black, graphite whisker, nano carbon fiber or carbon nanotube. A solvent was added to the mixture and the mixture was stirred and dried under vacuum condition. The dried mixture was milled to form a powder and filtered. Then 0.2 to 5 M of sulfuric acid was added to the mixture to form a paste and the paste was coated on a collecting mesh. The excess sulfuric acid was removed to acquire a cathode material.

The separator of a porous plastics membrane (such as PP, PP/PE/PP) was prepared. The electrolytic solution comprising sulfuric acid was prepared. The secondary cell was assembled in an anode material limited manner. Manufacturing processes of the secondary cell are shown in FIG. 3.

When the cell has a size of 1.5 cm×5 cm×1 cm, the cell weighs 13.5 g and has a capacity of 500 mAh and a voltage of 1.25 V.

EXAMPLE 5

Composition and Manufacturing of a Proton Secondary Cell Comprising Polyindole and Polyaniline (Using Organic Acidic Electrolytic Solution Comprising Organic Electrolyte to Activate Anode and Cathode Materials)

A mixture having 1% to 40% by weight of poly(5-nitroindole) or other nitro-containing polyindole and conductive carbon material mixed well with the polyindole was prepared. A solvent was added to the mixture and the mixture was stirred and dried under vacuum condition. The dried mixture was milled to form a powder and filtered. Then 3 to 5 mole of organic acidic electrolyte was added to the mixture to form a paste and the paste was coated on a collecting mesh. The excess organic acidic electrolyte was removed to acquire an anode material.

A mixture having 1% to 40% by weight of polyaniline and conductive carbon material mixed well with the polyaniline was prepared. The conductive carbon material was carbon black, graphite whisker, nano carbon fiber or carbon nanotube. A solvent was added to the mixture and the mixture was stirred and dried under vacuum condition. The dried mixture was milled to form a powder and filtered. Then 0.2 to 5 mole of organic acidic electrolyte was added to the mixture to form a paste and the paste was coated on a collecting mesh. The excess organic acidic electrolyte was removed to acquire an cathode material. The secondary cell was manufactured like example 4.

The separator of a porous membrane of polypropylene, plastics membrane of polyethylene and polypropylene, nylon, PES (polyether sulfone) or fluorine-containing resin was prepared. The electrolytic solution comprising organic electrolyte comprising propyl carbonate, ethyl carbonate, mono-ammonium phosphate, lithium perchlorate, di-methyl formamide (DMF) and tetraethylammonium tetrafluoroborate (TEATFB) was prepared.

When the cell has a size of 3.5 cm×5.5 cm×0.8 cm, the cell weighs 100 g and has a capacity of 4000 mAh and a voltage of 4 V.

Figure 4:
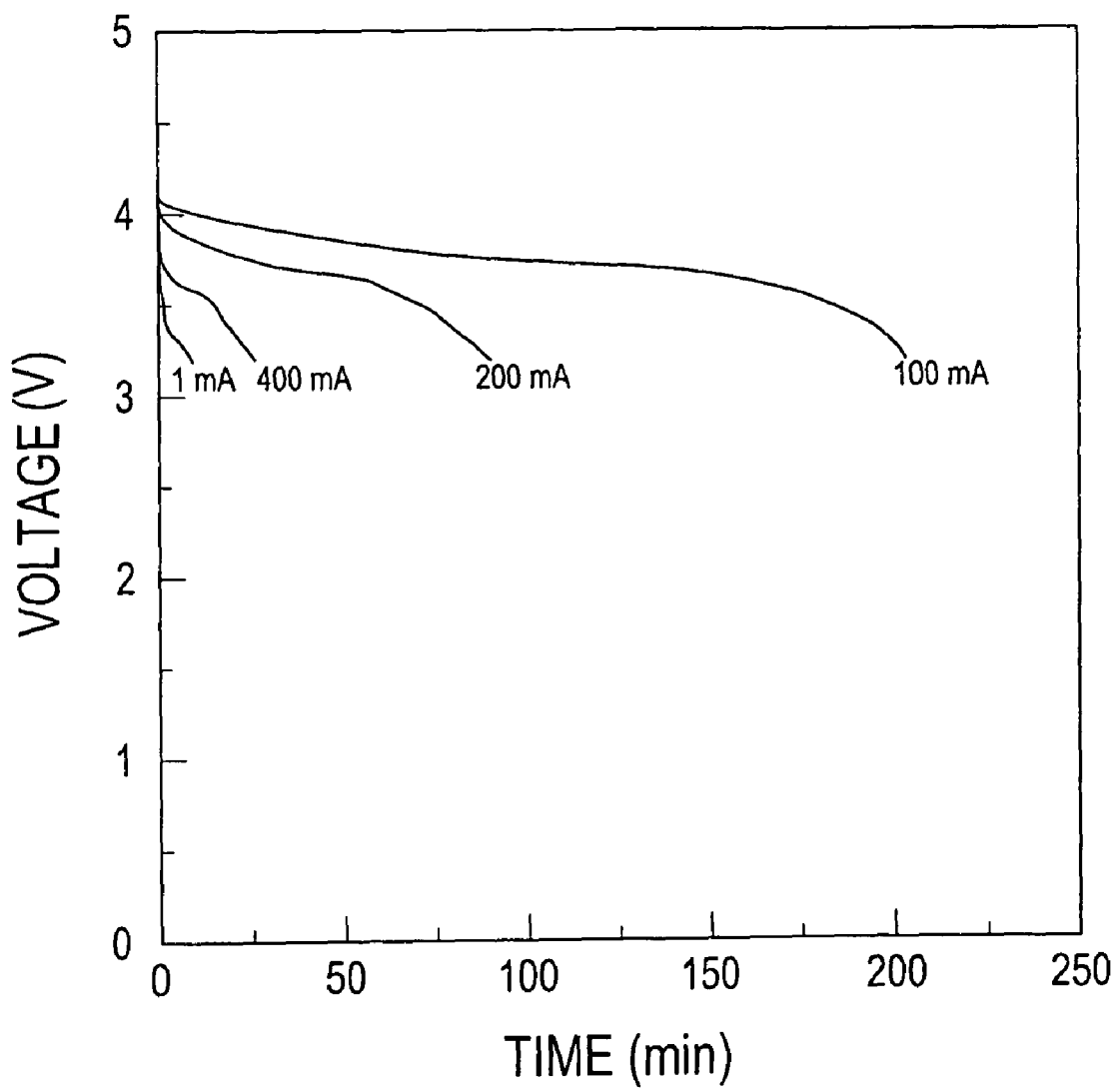
FIG. 4 is a graph of the voltage curves of a secondary cell at different discharge currents.

With reference to FIG. 4, the cell of Examples 5 has a weight of 1.2 g and a capacity of 200 to 250 mAh/g under a voltage of 3.5 to 4.2 V and discharge current of 100 to 1000 mA. The properties of the cells of Example 4 to 5 and other cells are shown in Table 1.

TABLE 1

Properties of different cells

| Cell type | Voltage (V) | | volumetric energy (WhL-1) | | gravimetric energy (Whkg-1) | |
|---|---|---|---|---|---|---|
| | Output voltage | Voltage range | Protic acid | Organic electrolyte* | Protic acid | Organic acid |
| Example 4 | 1.25 | 1~1.3 | 129 | — | 100 | — |
| Example 5 | 4 | 3.5~4.2 | — | 213 | — | 160 |
| Lithium | 3.6 | 2.5~4.2 | — | 400 | — | 150 |
| Lead-acid | 2 | 1.75~2 | 100 | — | 35 | — |

| Cell type | Cyclic number (cycles, 60% DOD) | Working temperature (° C.) | | Price | Environmental effect |
|---|---|---|---|---|---|
| | | Charge | Discharge | | |
| Example 4 | >10000 | -10~60 | -20~65 | low | excellent |
| Example 5 | >10000 | -10~60 | -20~65 | low | excellent |
| Lithium | ~1000 | 0~45 | -20~65 | moderate | good |
| Lead-acid | ~500 | -20~60 | -25~75 | low | good |

The key point of the present invention is to increase the cation absorption ability and conductivity of the conductive polymer so as to improve the discharge efficiency of the secondary cell. Additionally, the present invention also provides a suitable concentration range for doping acidic electrolytic solution. Thus, the operating voltage can be elevated more than 3 V and the volumetric and gravimetric capacity can also be raised. The preferable example of the present invention uses nitro-containing polyindole and polyaniline respectively in the anode and cathode materials and conductive carbon material such as conductive carbon black or carbon nanotube. The secondary cell uses protic acid or organic acidic electrolytic solution in the acidic electrolytic solution. When organic acid is used, the cyclic life of charging and discharging can be more than 100,000 cycles. When the voltage is between 3.5 to 4 V during charging and discharging, the capacity is more than 90% and can achieve 240 mAh/g.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A secondary cell comprising:
   a positive electrode material comprising a mixture having
      a nitrogen-containing conductive polymer being polyindole, which is chemically modified by at least one electron-withdrawing group, wherein the at least one electron withdrawing group is covalently linked to corresponding aromatic group in the nitrogen-containing conductive polymer; and
      a conductive carbon material being mixed with the polymer and being 1% to 40% by weight of the mixture; wherein
         the mixture is activated by a 0.2 M to 5 M proton-containing acidic electrolytic solution;
   a negative electrode material comprising a mixture having
      a conductive polymer being polyaniline; and
      a conductive carbon material being mixed with the polymer and being 1% to 40% by weight of the mixture; wherein
         the mixture is activated by a 0.2 M to 5 M proton-containing acidic electrolytic solution;
   a separator separating the positive electrode and negative electrode materials;
   an electrolytic solution being disposed between the positive electrode and negative electrode materials and comprising organic acidic electrolytic solution;
   a positive electrode collecting member being connected to the positive electrode material; and
   a negative electrode collecting member being connected to the negative electrode material,
   whereby the secondary cell has a cyclic life of charging and discharging more than 10,000 cycles.

2. The secondary cell as claimed in claim 1, wherein the at least one electron withdrawing group is selected from the group consisting of nitro, halogen, cyano, borate, phosphate, sulfonyl, cyanate and isocyanato radicals.

3. The secondary cell as claimed in claim 2, wherein the conductive carbon material is carbon black, graphite whisker, amorphous carbon, active carbon, mesoporous carbon, porous carbon fiber, nano carbon fiber, carbon nanotube or carbon fiber and has a particle size less than 10 μm.

4. The secondary cell as claimed in claim 3, wherein the separator is a porous membrane of polypropylene, composite membrane of polyethylene and polypropylene, Nylon, PES (polyether sulfone) or fluorine-containing resin and has a pore size less than 50 μm.

5. The secondary cell as claimed in claim 4, wherein the organic acidic electrolytic solution comprises methyl propyl carbonate, ethyl carbonate, mono-ammonium phosphate, lithium perchlorate, di-methyl formamide (DMF) and tetra-ethylammonium tetrafluoroborate (TEATFB).

6. The secondary cell as claimed in claim 5, wherein the electrolytic solution of the secondary cell further comprises nano inorganic particles.

7. The secondary cell as claimed in claim 6, wherein the nano inorganic particles are nano titanium dioxide, nano silicon dioxide or nano fullerene particles.

8. The secondary cell as claimed in claim 7, wherein the positive electrode collecting member and negative electrode collecting members are a metallic mesh/foil or conductive carbon material.

9. The secondary cell as claimed in claim 8, wherein the metallic mesh/foil of the positive electrode collecting member and negative electrode collecting members is a gold coated copper mesh/foil, gold coated aluminum mesh/foil, copper mesh/foil or aluminum mesh/foil.

10. The secondary cell as claimed in claim 8, wherein the carbon material of the positive electrode collecting member and negative electrode collecting member is a carbon fiber fabric/non-woven fabric, nano carbon fiber fabric/non-woven fabric or graphite whisker fabric/non-woven fabric.

11. The secondary cell as claimed in claim 9, wherein
   the secondary cell further comprises an outer sealing material; and
   the outer sealing material seals the positive electrode material and negative electrode material and is metal or plastic materials or composite material of metal and plastic.

12. The secondary cell as claimed in claim 10, wherein
the secondary cell further comprises an outer sealing material; and
the outer sealing material seals the positive electrode material and negative electrode material and is metal or plastic materials or composite material of metal and plastic.

13. The secondary cell as claimed in claim 1, wherein the separator is a porous membrane of polypropylene, composite membrane of polyethylene and polypropylene, Nylon, PES (polyether sulfone) or fluorine-containing resin and has a pore size less than 50 μm.

14. The secondary cell as claimed in claim 1, wherein the organic acidic electrolytic solution comprises methyl propyl carbonate, ethyl carbonate, mono-ammonium phosphate, lithium perchlorate, di-methyl formamide (DMF) and tetra-ethylammonium tetrafluoroborate (TEATFB).

15. The secondary cell as claimed in claim 1, wherein the electrolytic solution of the secondary cell further comprises nano inorganic particles.

16. The secondary cell as claimed in claim 1, wherein the anode positive electrode collecting member and cathode negative electrode collecting members are a metallic mesh/foil or conductive carbon material.

17. The secondary cell as claimed in claim 1, wherein
the secondary cell further comprises an outer sealing material; and
the outer sealing material seals the positive electrode and negative electrode materials and is metal or plastic materials or composite material of metal and plastic.

18. The secondary cell as claimed in claim 2, wherein the conductive carbon material is carbon black, graphite whisker, amorphous carbon, active carbon, mesoporous carbon, porous carbon fiber, nano carbon fiber, carbon nanotube or carbon fiber and has a particle size less than 10 μm.

19. The secondary cell as claimed in claim 18, wherein the separator is a porous membrane of polypropylene, composite membrane of polyethylene and polypropylene, Nylon, PES (polyether sulfone) or fluorine-containing resin and has a pore size less than 50 μm.

20. The secondary cell as claimed in claim 19, wherein the organic acidic electrolytic solution comprises methyl propyl carbonate, ethyl carbonate, mono-ammonium phosphate, lithium perchlorate, di-methyl formamide (DMF) and tetra-ethylammonium tetrafluoroborate (TEATFB).

21. The secondary cell as claimed in claim 20, wherein the electrolytic solution of the secondary cell further comprises nano inorganic particles.

22. The secondary cell as claimed in claim 21, wherein the nano inorganic particles are nano titanium dioxide, nano silicon dioxide or nano fullerene particles.

23. The secondary cell as claimed in claim 22, wherein the positive electrode collecting member and negative electrode collecting member are a metallic mesh/foil or conductive carbon material.

24. The secondary cell as claimed in claim 23, wherein the metallic mesh/foil of the positive electrode collecting member and negative electrode collecting member is a gold coated copper mesh/foil, gold coated aluminum mesh/foil, copper mesh/foil or aluminum mesh/foil.

25. The secondary cell as claimed in claim 23, wherein the carbon material of the positive electrode collecting member and negative electrode collecting members is a carbon fiber fabric/non-woven fabric, nano carbon fiber fabric/non-woven fabric or graphite whisker fabric/non-woven fabric.

26. The secondary cell as claimed in claim 24, wherein
the secondary cell further comprises an outer sealing material; and
the outer sealing material seals the positive electrode and negative electrode materials and is metal or plastic materials or composite material of metal and plastic.

27. The secondary cell as claimed in claim 25, wherein
the secondary cell further comprises an outer sealing material; and
the outer sealing material seals the positive electrode and negative electrode materials and is metal or plastic materials or composite material of metal and plastic.

28. The secondary cell as claimed in claim 1, wherein the conductive carbon material is carbon black, graphite whisker, amorphous carbon, active carbon, mesoporous carbon, porous carbon fiber, nano carbon fiber, carbon nanotube or carbon fiber and has a particle size less than 10 μm.

29. The secondary cell as claimed in claim 28, wherein the separator is a porous membrane of polypropylene, composite membrane of polyethylene and polypropylene, Nylon, PES (polyether sulfone) or fluorine-containing resin and has a pore size less than 50 μm.

30. The secondary cell as claimed in claim 29, wherein the organic acidic electrolytic solution comprises methyl propyl carbonate, ethyl carbonate, mono-ammonium phosphate, lithium perchlorate, di-methyl formamide (DMF) and tetra-ethylammonium tetrafluoroborate (TEATFB).

31. The secondary cell as claimed in claim 30, wherein the electrolytic solution of the secondary cell further comprises nano inorganic particles.

32. The secondary cell as claimed in claim 31, wherein the nano inorganic particles are nano titanium dioxide, nano silicon dioxide or nano fullerene particles.

33. The secondary cell as claimed in claim 32, wherein the positive electrode collecting member and negative electrode collecting member are a metallic mesh/foil or conductive carbon material.

34. The secondary cell as claimed in claim 33, wherein the metallic mesh/foil of the positive electrode collecting member and negative electrode collecting member is a gold coated copper mesh/foil, gold coated aluminum mesh/foil, copper mesh/foil or aluminum mesh/foil.

35. The secondary cell as claimed in claim 33, wherein the carbon material of the positive electrode collecting member and negative electrode collecting member is a carbon fiber fabric/non-woven fabric, nano carbon fiber fabric/non-woven fabric or graphite whisker fabric/non-woven fabric.

36. The secondary cell as claimed in claim 34, wherein the secondary cell further comprises an outer sealing material; and
the outer sealing material seals the positive electrode material and negative electrode material and is metal or plastic materials or composite material of metal and plastic.

37. The secondary cell as claimed in claim 35, wherein the secondary cell further comprises an outer sealing material; and
the outer sealing material seals the positive electrode material and negative electrode material and is metal or plastic materials or composite material of metal and plastic.

38. The secondary cell as claimed in claim 2, wherein the conductive carbon material is carbon black, graphite whisker, amorphous carbon, active carbon, mesoporous carbon, porous carbon fiber, nano carbon fiber, carbon nanotube or carbon fiber and has a particle size less than 10 μm.

39. The secondary cell as claimed in claim 38, wherein the separator is a porous membrane of polypropylene, composite membrane of polyethylene and polypropylene, Nylon, PES (polyether sulfone) or fluorine-containing resin and has a pore size less than 50 μm.

40. The secondary cell as claimed in claim 39, wherein the organic acidic electrolytic solution comprises methyl propyl carbonate, ethyl carbonate, mono-ammonium phosphate, lithium perchlorate, di-methyl formamide (DMF) and tetra-ethylammonium tetrafluoroborate (TEATFB).

41. The secondary cell as claimed in claim 40, wherein the electrolytic solution of the secondary cell further comprises nano inorganic particles.

42. The secondary cell as claimed in claim 41, wherein the nano inorganic particles are nano titanium dioxide, nano silicon dioxide or nano fullerene particles.

43. The secondary cell as claimed in claim 42, wherein the positive electrode collecting member and negative electrode collecting member are a metallic mesh/foil or conductive carbon material.

44. The secondary cell as claimed in claim 43, wherein the metallic mesh/foil of the positive electrode collecting member and negative electrode collecting member is a gold coated copper mesh/foil, gold coated aluminum mesh/foil, copper mesh/foil or aluminum mesh/foil.

45. The secondary cell as claimed in claim 43, wherein the carbon material of the positive electrode collecting member and negative electrode collecting member is a carbon fiber fabric/non-woven fabric, nano carbon fiber fabric/non-woven fabric or graphite whisker fabric/non-woven fabric.

46. The secondary cell as claimed in claim 44, wherein the secondary cell further comprises an outer sealing material; and
    the outer sealing material seals the positive electrode material and negative electrode material and is metal or plastic materials or composite material of metal and plastic.

47. The secondary cell as claimed in claim 45, wherein the secondary cell further comprises an outer sealing material; and
    the outer sealing material seals the positive electrode material and negative electrode material and is metal or plastic materials or composite material of metal and plastic.

48. The secondary cell as claimed in claim 1, wherein the conductive carbon material is carbon black, graphite whisker, amorphous carbon, active carbon, mesoporous carbon, porous carbon fiber, nano carbon fiber, carbon nanotube or carbon fiber and has a particle size less than 10 μm.

49. The secondary cell as claimed in claim 48, wherein the separator is a porous membrane of polypropylene, composite membrane of polyethylene and polypropylene, Nylon, PES (polyether sulfone) or fluorine-containing resin and has a pore size less than 50 μm.

50. The secondary cell as claimed in claim 49, wherein the organic acidic electrolytic solution comprises methyl propyl carbonate, ethyl carbonate, mono-ammonium phosphate, lithium perchlorate, di-methyl formamide (DMF) and tetra-ethylammonium tetrafluoroborate (TEATFB).

51. The secondary cell as claimed in claim 50, wherein the electrolytic solution of the secondary cell further comprises nano inorganic particles.

52. The secondary cell as claimed in claim 51, wherein the nano inorganic particles are nano titanium dioxide, nano silicon dioxide or nano fullerene particles.

53. The secondary cell as claimed in claim 52, wherein the positive electrode collecting member and negative electrode collecting member are a metallic mesh/foil or conductive carbon material.

54. The secondary cell as claimed in claim 53, wherein the metallic mesh/foil of the positive electrode collecting member and negative electrode collecting member is a gold coated copper mesh/foil, gold coated aluminum mesh/foil, copper mesh/foil or aluminum mesh/foil.

55. The secondary cell as claimed in claim 53, wherein the carbon material of the positive electrode collecting member and negative electrode collecting members is a carbon fiber fabric/non-woven fabric, nano carbon fiber fabric/non-woven fabric or graphite whisker fabric/non-woven fabric.

56. The secondary cell as claimed in claim 54, wherein the secondary cell further comprises an outer sealing material; and
    the outer sealing material seals the positive electrode material and negative electrode materials and is metal or plastic materials or composite material of metal and plastic.

57. The secondary cell as claimed in claim 55, wherein the secondary cell further comprises an outer sealing material; and
    the outer sealing material seals the positive electrode material and negative electrode material and is metal or plastic materials or composite material of metal and plastic.

* * * * *